United States Patent [19]

Little et al.

[11] Patent Number: 5,013,922

[45] Date of Patent: May 7, 1991

[54] REDUCED THICKNESS RADIATION WINDOW FOR AN IONIZATION DETECTOR

[75] Inventors: Francis H. Little; Douglas E. Ingram, both of Cincinnati, Ohio

[73] Assignee: General Electric Company, Cincinnati, Ohio

[21] Appl. No.: 492,169

[22] Filed: Mar. 13, 1990

[51] Int. Cl.[5] .................... G01T 1/18

[52] U.S. Cl. .................... 250/385.1; 250/374

[58] Field of Search .................... 250/385.1, 374, 382, 250/389, 384, 360.1, 367, 369

[56] References Cited

U.S. PATENT DOCUMENTS

| | | | |
|---|---|---|---|
| 2,665,391 | 1/1954 | Bleeksma | 313/59 |
| 3,609,432 | 9/1971 | Shimula | 313/59 |
| 3,617,788 | 11/1971 | Goorimen | 313/59 |
| 4,075,526 | 2/1978 | Grulis | 313/56 |
| 4,161,655 | 7/1979 | Cotic et al. | 250/385 |
| 4,167,674 | 9/1979 | Koontz et al. | 250/481 |
| 4,260,891 | 4/1981 | Williams | 250/385.1 |
| 4,306,155 | 12/1981 | Cotic | 250/385.1 |
| 4,394,578 | 7/1983 | Houston et al. | 250/374 |
| 4,570,071 | 2/1986 | Sippel et al. | 250/374 |
| 4,634,251 | 1/1987 | Jonker | 354/312 |
| 4,795,909 | 1/1989 | Dibianca | 250/385.1 |

*Primary Examiner*—Carolyn E. Fields
*Assistant Examiner*—James E. Beyer
*Attorney, Agent, or Firm*—Jerome C. Squillaro; Charles L. Moore, Jr.

[57] ABSTRACT

A method and apparatus for increasing response to low intensity radiation in a radiation detector includes a housing surrounding a chamber, a window adjoining the chamber, and a slot formed in one side of the chamber for admitting a circuit board into the chamber. The board supports an array of elongated detector elements on a surface thereof, an electrically conductive plate within the chamber and substantially parallel with the array of detector elements, sealant means in the slot surrounding the circuit board for providing a gas impervious seal, an ionizable gas contained in the chamber under high pressure, and a collimator mounted in a collimator support and positioned outside the chamber for directing ionizing radiation through the window for detection. The method comprises reducing the window thickness to a value below that required to withstand gas pressure in the chamber without distortion, and also comprises clamping the collimator support to the housing and against the window such that a major portion of the window abuts the collimator support and is externally supported thereby.

12 Claims, 2 Drawing Sheets

REDUCED THICKNESS RADIATION WINDOW FOR AN IONIZATION DETECTOR

The present inVention relates to ionization detectors and, more particularly, to such detectors as are used in X-ray tomography.

BACKGROUND OF THE INVENTION

An X-ray detector of the type for which the present invention is particularly adapted is shown in U.S. Pat. Nos. 4,394,578 and 4,570,071. These detectors generally comprise a housing surrounding a chamber with a radiation window aligned on one side of the chamber and a slot formed in another side of the chamber for admitting a circuit board into the chamber. The circuit board supports an array of elongated charge detector elements on one surface. An electrically conductive plate is positioned within the chamber and arranged substantially parallel with the array of detector elements. The slot is sealed about the detector board so that the chamber is gas impervious. An ionizable gas is contained in the chamber under very high pressure to provide ions when excited by radiation entering through the window. A collimator is positioned outside the chamber and oriented to pass a thin beam of radiation through the window into the chamber. The detector measures the amount of received radiation by monitoring the charge transferred between the electrically conductive plate and the detector elements from ions created in the gas as it is excited by the radiation.

Radiation detectors of the type described above are used in various applications. Commonly, such detectors are used in X-ray inspection techniques for factory applications. An example of the use of such a detector could be in the X-ray inspection of turbine blades for aircraft engines. The effectiveness of such X-ray inspection systems is directly dependent upon the efficiency of the detector. One of the features of such detectors which affects its efficiency is the need to provide a relatively thick X-ray radiation transmissive window in order to support the high pressure gas contained within the chamber. For example, the gas within the radiation chamber may be at a pressure of about 1100 pounds per square inch. Typically, the radiation window is formed by milling a portion out of an aluminum block to form one side of the pressure chamber. This block is then attached to another block in which a similar concavity has been milled so that when the two blocks are placed together, a pressure chamber having an approximately oval shape in cross-section is formed. The support block is normally formed of steel or other suitably strong material since it does not have to pass radiation and can be made sufficiently massive to withstand the pressure within the chamber without deformation. The block containing the window is, however, generally formed of aluminum in order to provide minimal attenuation of the radiation passing through the window. Deformation of the aluminum portion in a direction perpendicular to the direction of radiation entering the chamber can be accommodated by bolting the aluminum portion to the steel portion. However, in order to prevent the window from being deformed in a line parallel to the direction of radiation, it is necessary to leave sufficient thickness of aluminum in that window area to support the high pressure within the chamber. Typically, a minimum window thickness is approximately ⅛ of an inch. In applications where it is necessary to inspect low density materials, the attenuation ratio between the detector window and the part to be inspected becomes critical.

SUMMARY OF THE INVENTION

It is an object of the present invention to provide an X-ray detector which overcomes the above and other disadvantages of the prior art.

It is another object of the present invention to provide an X-ray detector having a reduced thickness window for reduced absorption of radiation.

It is a still further object of the present invention to provide a method and apparatus for reinforcing a window in an X-ray ionization chamber in a manner which reduces the window thickness and does not add additional elements to the detector.

In accordance with a preferred embodiment of the present invention, there is provided a method and apparatus for reducing the window thickness of an X-ray radiation detector to a value below that required to withstand gas pressure in the chamber without distortion in which the method and apparatus includes clamping the collimator support to the housing containing the window and abutting the collimator and support against the window such that a major portion of the window is supported externally by the abutting pressure of the collimator and support. In one form, the collimator support is directly placed against the window and the window thickness is reduced to a value of approximately 0.05 inch. In another form, the collimator support is reversed and positioned so that the collimator itself is placed against the window for supporting the window externally and to thereby allow the window thickness to be reduced to as low as 0.01 inch. The reduction in window thickness is achieved since the collimator and the collimator support are provided with relatively thin apertures for passing X-ray radiation so that the portion of the window which is not supported may be in the order of 0.02 inch.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
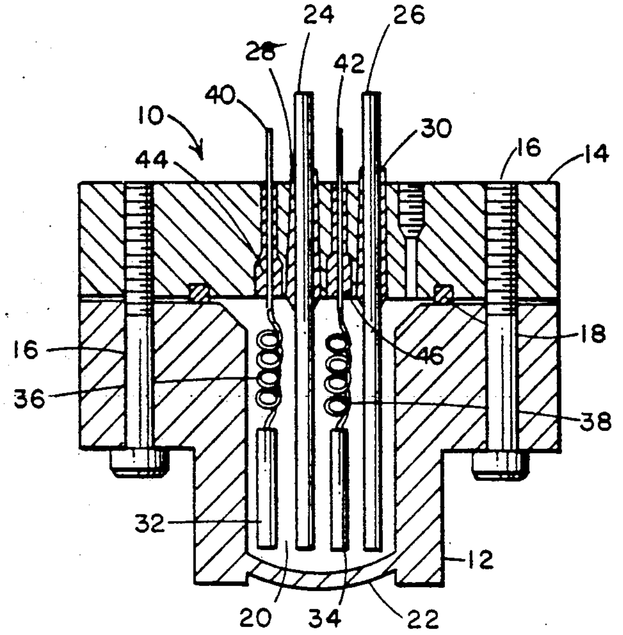
FIG. 1 (PRIOR ART)
FIG. 1 is a cross-sectional view of one form of prior art radiation detector.

Before turning to a description of the present invention, reference is first made to FIG. 1 which illustrates an X-ray detector 10 having a housing 12 of a metal or metal alloy and having an end plate 14 of metal or metal alloy attached to it by bolts 16. The end plate is sealed to the housing 12 by an 0-ring seal 18 made of compressible material such as rubber. The housing 12 includes a chamber 20 closed at one end by a window 22 formed of a relatively thin sheet of material readily penetrated by X-rays, for example, aluminum. The opposite end of the chamber 20 is closed by the end plate 14. Extending through the end plate 14 are collector plates 24, 26 which are sealed by tape or epoxy seals 28, 30, respectively. Also disposed in the chamber are electrically conductive voltage plates 32, 34 connected by electrical conductors 36, 38, respectively, to electrical contacts 40, 42, respectively, which extend through the end plate 14 and are sealed with gaskets 44, 46. While shown as including multiple collector plates and multiple voltage plates, many of such collectors are simply provided with a single collector plate and a single electrically conductive plate. Radiation enters the chamber 20 through the window 22 and ionizes a gas, such as, for example, xenon gas, contained within the chamber 20. The electrical charge on the voltage plates 32, 34 causes the ions to migrate toward the conductive elements on the collection plates 24, 26 where the accumulated charge is measured as an electrical current. In this manner, the magnitude of the X-ray radiation penetrating into the chamber 20 is determined by means of the transfer of charge to electrical conductors on the circuit boards 24, 26.

Figure 2:
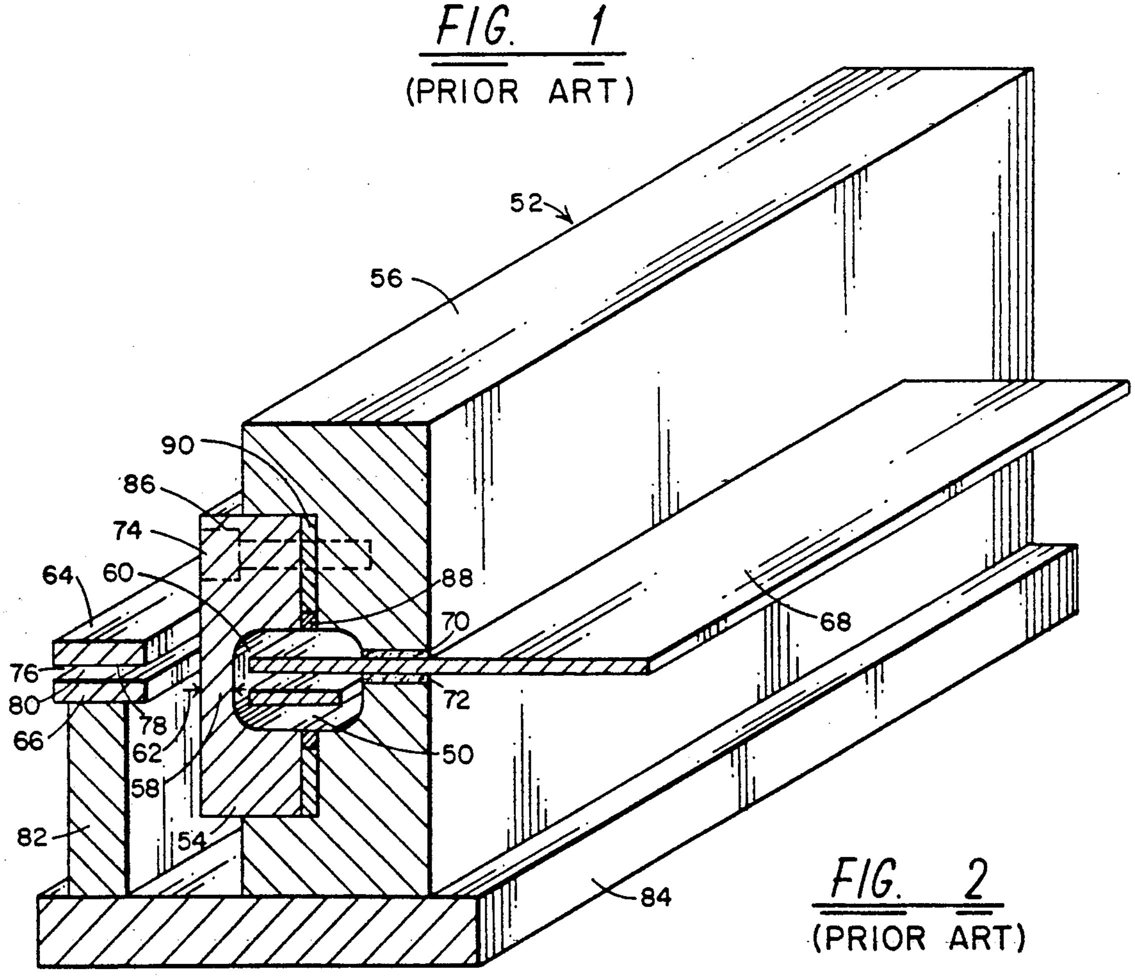
FIG. 2 (PRIOR ART)
FIG. 2 is a cross-sectional view of another form of radiation detector.

FIG. 2 is a cross-sectional view of an ionization detector using a single board and single electrically conductive voltage plate. The arrangement in FIG. 2 has been more effective in reducing the bowing of the window or of the chamber housing itself as compared to the arrangement of FIG. 1. In FIG. 2, a chamber 50 within a housing 52 is constructed with an oval configuration. An increased mass of material is positioned both above and below the chamber 50 in order to provide structural strength for the chamber. The housing 52 includes an aluminum front portion 54 and a steel rear portion 56. A window 58 is formed in front portion 54 and has an inner surface 60 which is slightly curved such that the window thickness indicated by dimension 62 is approximately ⅛ of an inch, resulting in a ⅛ inch thick window through which the X-rays entering the chamber 50 can pass, a thickness necessary to prevent deformation under the high gas pressure. The window is not uniformly thick since it has a curved shape but does have a substantially uniform thickness in the area adjacent the external collimator blocks 64 and 66. A detector board 68 is sealed at a slot 70 using epoxy cement to establish a seal 72. A plurality of bolts 74 pass between the front and rear sections of the housing 52 and firmly attach one to the other. The collimator plates 64 and 66, generally constructed of tungsten, define a slit 76 between their parallel faces 78 and 80, The slit 76 may be in the range of 0.0115 inch to assure that the X-rays entering the chamber 50 are collimated to be substantially parallel. The collimator plates 64 and 66 are generally mounted on a collimator support 82 which is supported upon a base 84 on which the housing 52 is mounted. In other words, there is no direct physical connection between the collimator plates 64, 66 and the window 58. In the form illustrated in FIG. 2, the rear housing portion 56 is formed in a substantially C-shaped configuration out of a steel material. The forward half of the detector chamber 50 is formed by the front aluminum housing portion 54 also having a substantial C-shape configuration but which fits within a cutout portion or recess 90 formed in the steel housing portion 56. The aluminum housing portion 54 is bolted to the steel housing portion 56 by the clamp screws 74. These clamp screws may be cap headed screws which enable them to be recessed within countersunk bores 86 in the aluminum housing. An 0-ring type seal 88 and a steel gasket 90 are clamped between the housing portions to provide a gas seal.

Figure 3:
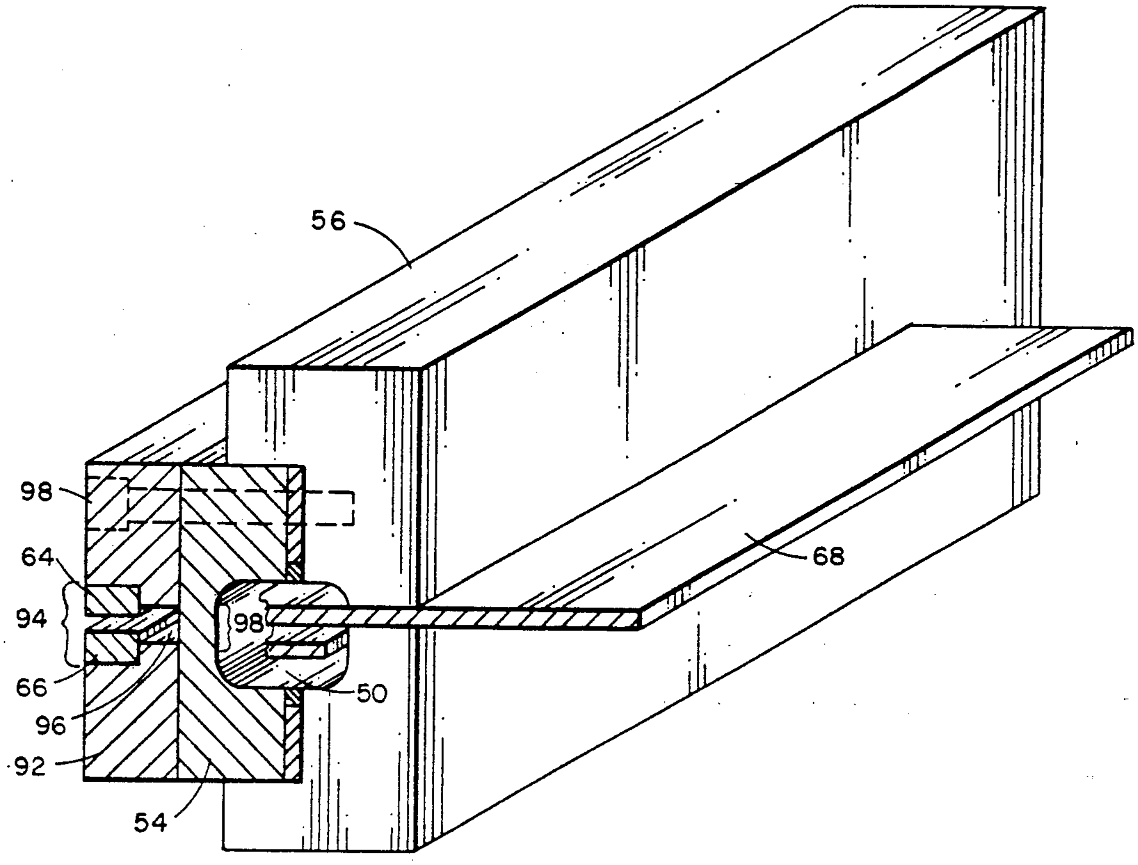
FIG. 3 is a cross-sectional view of a radiation detector incorporating the teaching of the present invention in one form.

Turning now to FIG. 3, there is shown a modification of the apparatus of FIG. 2 which enables the thickness of the window 58 to be significantly reduced. In this modification, the collimators 64, 66 have been embedded into a separate collimator support 92 which may be formed of aluminum or of steel. The collimators 64 and 66 are positioned within a recessed area 94 in the collimator support. A slot 96 extends from the recessed area up to the area of the window 58. In this manner, the collimator support does not affect any of the X-rays passing through the collimators and entering into the detector chamber 50. The collimators are spaced apart a distance of about 0.01 of an inch. The slot 96 may have a width in the vertical direction indicated in FIG. 3 of about 0.02 inch. When the collimator support 92 is bolted against the aluminum housing portion 54, it provides additional structural support to the housing to prevent it from being bowed outward by the high pressure xenon gas within the chamber 50. A plurality of longer screws 98 pass through both the collimator support 92 and the detector housing portion 54.

At the portion of the window 58 adjacent the slot 96, there is only a portion of approximately 0.02 inch which does not have an external pressure applied forcing the window inward towards the chamber 50. Accordingly, there is a very narrow area 98 of the window 58 which is not provided with external support. As a consequence, the thickness of the window in the indicated direction can be significantly reduced. Applicants have found that in this embodiment, the window thickness can be reduced to about 0.05 inch without exhibiting the aforementioned bowing characteristics caused by the high pressure gas within the chamber. By reducing this window thickness, X-rays having lower intensity pass through the window and can be detected by the detector board and thus provide additional information about an object being inspected. Alternatively, lower energy X-rays may be utilized with this device in order to minimize the X-ray exposure to an object or person.

Figure 4:
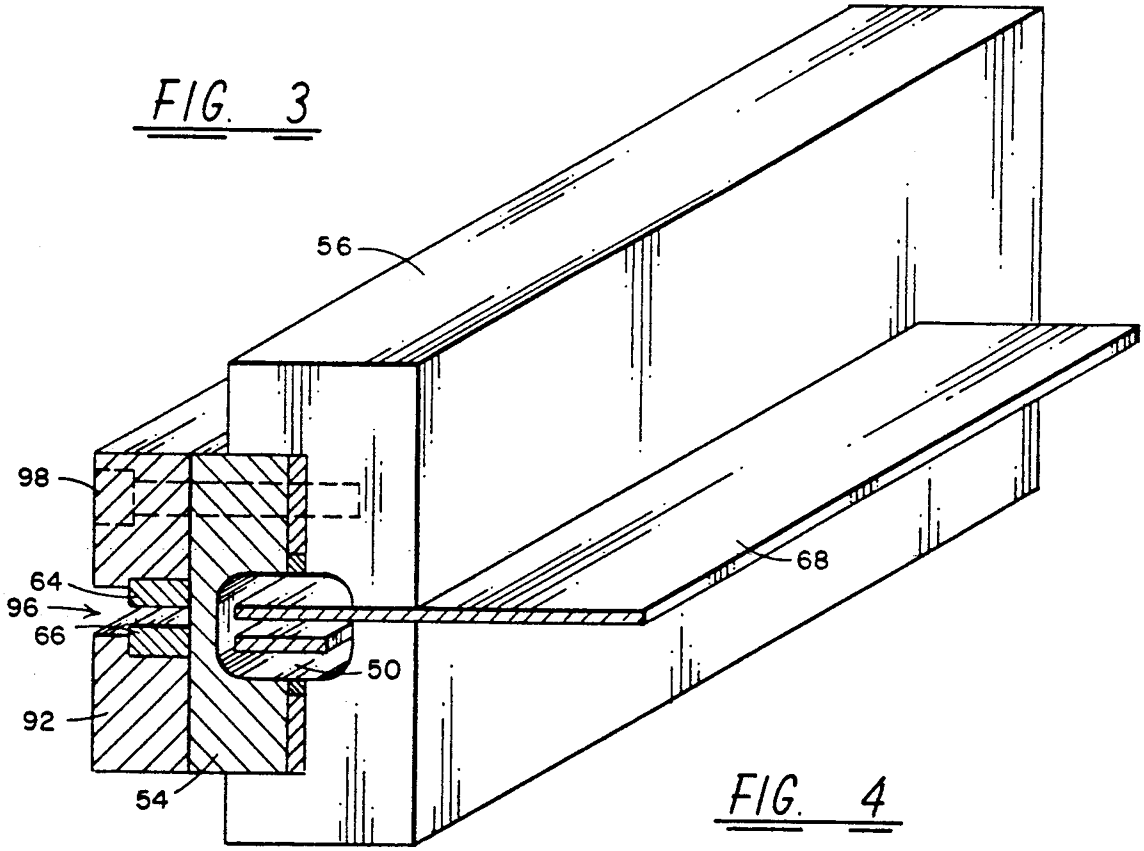
FIG. 4 is a cross-sectional view of a radiation detector incorporating the teaching of the present invention in another form.

Turning now to FIG. 4, there is shown a further embodiment of the present invention which allows a still further decrease in window thickness. In this embodiment, the collimator support has been arranged in a reverse position so that the collimators 64, 66 are pressed against the window 58. Since the collimators have a spacing which is approximately half that of the slot 96, there is even less area of the window 58 which is not supported by external pressure from the collimators and collimator support. Consequently, Applicants have found that in this embodiment with a collimator spacing of approximately 0.01 inch, the thickness of the Window 58 can be reduced to about 0.01 inch. It will be appreciated that this thickness is approximately that of aluminum foil. Yet, the support on the outside of the window prevents the gas at a pressure of 1100 p.s.i. from pushing the window out. The obvious advantages from having a window of such reduced thickness is to allow collection of softer X-rays, i.e., lower energy X-rays, thus providing better definition of an article being inspected.

It will be appreciated that what has been described is a method and apparatus for reducing the thickness of an X-ray window in an X-ray inspection system having a high pressure xenon gas detection chamber by repositioning the collimators and incorporating a collimator support which can be pressed against the external surface of a window in order to provide support for the window.

While the invention has been described in what is presently considered to be a preferred embodiment, other modifications and variations will become apparent to those skilled in the art. It is intended, therefore, that the invention not be limited to the specific embodiment but be interpreted within the full spirit and scope of the appended claims.

What is claimed is:

1. A method for increasing response to low intensity radiation in a radiation detector having a housing surrounding a chamber, a window adjoining the chamber and a first slot formed in one side of the chamber for admitting a circuit board into the chamber, the board supporting an array of elongated detector elements on a surface thereof, an electrically conductive plate within the chamber and substantially parallel with the array of detector elements, sealant means in the slot surrounding the circuit board for providing a gas impervious seal, an ionizable gas contained in the chamber under high pressure and a collimator comprising a pair of spaced parallel plates mounted in a collimator support and positioned outside the chamber for directing ionizing radiation through the window for detection, the method comprising the steps of:

reducing the window thickness to a value below that required to withstand gas pressure in the chamber without distortion; and clamping the collimator support to the housing and against the window such that a major portion of the window abuts the collimator support and is externally supported thereby, the collimator support having a second slot formed therein of a selected width to prevent the window from being distorted by the high pressure ionizable gas.

2. The method of claim 1 and further including the step of orienting the collimator support whereby the collimator abuts the window, the collimator having a selected spacing between its plates to prevent the window from being bowed outwardly by the high pressure ionizable gas.

3. The method of claim 1 wherein the chamber comprises a first elongated steel end plate having a first concavity formed therein and a second elongated aluminum insert having a second concavity formed therein, the chamber being formed by abutting the steel end plate with the aluminum insert with the first and second concavities being aligned, the step of reducing the window thickness comprising the step of machining material from within said second concavity to reduce wall thickness of said insert.

4. The method of claim 1 wherein the step of reducing window thickness includes the step of removing window material until window thickness is between about 0.03 and 0.01 inches.

5. The method of claim 1, wherein the selected width is about 0.02 inches.

6. The method of claim 2, wherein the selected spacing is about 0.01 inches.

7. Apparatus for increasing response to low intensity radiation in a radiation detector having a housing surrounding a chamber, a window adjoining the chamber and a slot formed in one side of the chamber for admitting at least one circuit board into the chamber, the board supporting an array of elongated detector elements on a surface thereof, at least one electrically conductive plate within the chamber and substantially parallel with the array of detector elements, sealant means in the slot surrounding the circuit board for providing a gas impervious seal, an ionizable gas contained in the chamber under high pressure and a collimator mounted in a collimator support and positioned outside the chamber for directing ionizing radiation through the window for detection, the collimator, comprising:

a pair of spaced radiation attenuating bars defining a silt therebetween, the bars being fastened within a recess in the collimator support;

the collimator support having a slot formed therein and extending through the support from the slit; and means clamping the collimator support to the housing and against the window such that a major portion of the window abuts the collimator support and is extremely support thereby to prevent the window from being distorted by the high pressure ionizable gas, the window having a thickness less than that required to withstand the gas pressure in the chamber without distorting.

8. The apparatus of claim 5 and wherein the collimator support is oriented such that the slot in the collimator abuts the window.

9. The apparatus of claim 5 wherein the chamber comprises a first elongated steel end plate having a first concavity formed therein and a second elongated aluminum insert having a second concavity formed therein, the chamber being formed by abutting the steel end plate with the aluminum insert with the first and second concavities being aligned, the collimator support being oriented such that the collimator abuts the window.

10. The apparatus of claim 7 wherein the window has a thickness of about 0.01 inch.

11. The apparatus of claim 5, wherein the radiation attenuation bars are spaced apart by about 0.01 inches.

12. The apparatus of claim 5, wherein the collimator support slot has a width of about 0.02 inches.

* * * * *